US012287125B1

(12) United States Patent
Oles et al.

(10) Patent No.: US 12,287,125 B1
(45) Date of Patent: Apr. 29, 2025

(54) PARTICLE SUPPRESSOR FOR A CENTRIFUGAL PARTICLE RECEIVER

(71) Applicant: Heliogen Holdings, Inc., Pasadena, CA (US)

(72) Inventors: Andrew Stephen Oles, Baltimore, MD (US); Apurba Kumar Das, Katy, TX (US); Charles Ryan Steingard, Los Angeles, CA (US)

(73) Assignee: Heliogen Holdings, Inc., Pasadena, CA (US)

( * ) Notice: Subject to any disclaimer, the term of this patent is extended or adjusted under 35 U.S.C. 154(b) by 0 days.

(21) Appl. No.: 18/670,021

(22) Filed: May 21, 2024

(51) Int. Cl.
*F24S 20/20* (2018.01)
*F24S 10/60* (2018.01)
*F24S 80/00* (2018.01)
*F24S 80/30* (2018.01)

(52) U.S. Cl.
CPC ............... *F24S 80/30* (2018.05); *F24S 20/20* (2018.05); *F24S 10/60* (2018.05); *F24S 2080/05* (2018.05)

(58) Field of Classification Search
CPC ... B04B 11/06; B04B 1/06; B04B 1/08; F26B 17/103; B65G 69/0458; B65G 69/0441; B65G 45/10
USPC ............... 414/299; 141/34; 193/10
See application file for complete search history.

(56) References Cited

U.S. PATENT DOCUMENTS

| 612,776 | A | * | 10/1898 | Kelly | ....................... B02C 2/10 241/162 |
| 4,443,186 | A | * | 4/1984 | Shell | ........................ F26B 3/28 432/103 |
| 2024/0142222 | A1 | * | 5/2024 | Franke | ............... G01B 11/2522 |

FOREIGN PATENT DOCUMENTS

| CN | 114183938 A | * | 3/2022 | |
| DE | 102010062367 A1 | * | 2/2012 | ................. F24J 2/07 |

* cited by examiner

*Primary Examiner* — Jorge A Pereiro
(74) *Attorney, Agent, or Firm* — Knobbe, Martens, Olson and Bear, LLP (57) ABSTRACT

A particle suppressor can be used in a particle receiver to reduce the particle loss rate. The receiver can include a rotating drum with an inliner. The particle suppressor can include a retaining surface. The retaining surface can be spaced away from and extend concentrically with the inline. A spacing gap between the inliner and the retaining surface can dampen the motion of bouncing particles. The spacing gap can be between 15 mm and 20 mm. In some embodiments, the particle suppressor can include a support ring with a plurality of suppressor segments disposed circumferentially around the support ring. The particle suppressor can include a plurality of suppressor segments coupled directly to the inliner. A heat shield can be coupled to the particle suppressor. A support bracket can suspend the particle suppressor within the receiver.

18 Claims, 9 Drawing Sheets

PARTICLE SUPPRESSOR FOR A CENTRIFUGAL PARTICLE RECEIVER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to a particle receiver system for use, for example, in a concentrated solar power (CSP) system. More specifically, the present disclosure relates to particularly to a particle suppressor for a centrifugal particle receiver.

Description of the Related Art

Conventional solar energy systems utilize solar panels to convert sunlight into electricity. However, conventional solar energy systems have various drawbacks that make them inefficient and ineffective for capturing energy from the sun and using it for large energy intensive industries. As an alternative to solar panel based solar energy systems, concentrated solar power (CSP) systems have been developed for applications in various energy intensive industrial processes. Many of these CSP systems rely on particles as a heat transfer medium for converting solar energy into thermal energy. In such CSP systems, a centrifugal particle receiver is commonly utilized to heat the particles with concentrated sunlight. However, existing particle feed systems are unable to efficiently feed particles into the centrifugal particle receiver without losing particles. Many particles bounce around the receiver and flee out of the receiver's aperture. Thus, existing CSP systems experience significant particle losses that contribute to energy and economic inefficiencies.

SUMMARY

The systems, methods, and devices described herein have innovative aspects, no single one of which is indispensable or solely responsible for their desirable attributes. Without limiting the scope of the claims, some of the advantageous features will now be summarized.

In certain aspects, the present disclosure provides, among other things, a receiver comprising a rotating drum having an interior surface, an inliner coupled to and extending circumferentially around the interior surface, and a particle suppressor disposed within the rotating drum and comprising a retaining surface. The retaining surface is spaced radially inward from the inliner to define a spacing gap between the inliner and the retaining surface. The retaining surface extends concentrically with the inliner. The particle suppressor is configured to dampen a motion of one or more particles introduced into the rotating drum.

In certain aspects, the retaining surface is substantially parallel to the interior surface.

In certain aspects, the spacing gap is about 15 mm to 20 mm.

In certain aspects, the retaining surface is disposed about 5 mm to 10 mm away from a top surface of a particle film.

In certain aspects, the retaining surface comprises a dampening portion extending substantially parallel to the inliner and a funneling portion coupled to the dampening portion. The funneling portion is angled with respect to the dampening portion. The funneling portion is configured to funnel particles towards the dampening portion.

In certain aspects, the particle suppressor is configured to rotate with the rotating drum.

In certain aspects, the particle suppressor is suspended within the rotating drum by a support bracket extending from the particle suppressor to a first end of the receiver.

In certain aspects, the support bracket is fixedly coupled to the receiver such that the particle suppressor does not rotate with the rotating drum.

In certain aspects, the receiver further comprises a heat shield coupled to the particle suppressor, wherein the heat shield is disposed radially within the particle suppressor.

In certain aspects, the particle suppressor is configured to reduce a particle loss rate of the receiver by at least 30%.

In other aspects, the present disclosure provides a particle suppressor for a receiver having a rotating drum. The particle suppressor comprises a support ring and a plurality of suppressor segments coupled to and extending circumferentially around the support ring. The plurality of suppressor segments each comprise a portion of a retaining surface, wherein the retaining surface is configured to be spaced radially inward from and extend concentrically with an interior surface of the rotating drum. A spacing gap is formed between the interior surface and the retaining surface. The retaining surface is configured to dampen a motion of one or more particles introduced into the rotating drum.

In certain aspects, the plurality of suppressor segments are adjustably coupled to the support ring, wherein each of the plurality of suppressor segments can be independently moved radially inward or radially outward relative to a center of the support ring.

In certain aspects, each of the plurality of suppressor segments is adjustably coupled to the support ring by a plurality of attachment points.

In certain aspects, each of the plurality of suppressor segments comprises a plurality of slots, wherein each of the plurality of suppressor segments can be adjusted by moving the plurality of attachment points within the plurality of slots.

In certain aspects, each of the plurality of suppressor segments are L-shaped.

In certain aspects, the particle suppressor is suspended within the rotating drum by a support structure extending between the rotating drum and the support ring.

In other aspects, the present disclosure provides a particle suppressor for a receiver having a rotating drum. The particle suppressor comprises a retaining surface extending concentrically with an interior surface of the rotating drum, and a plurality of suppressor segments, wherein each of the plurality of suppressor segments comprises a portion of the retaining surface. The retaining surface is disposed radially inward from the interior surface to define a spacing gap between the interior surface and the retaining surface. The retaining surface is configured to dampen a motion of one or more particles introduced into the rotating drum.

In certain aspects, each of the plurality of suppressor segments is coupled to the rotating drum by a standoff rod.

In certain aspects, the particle receiver further comprises a heat shield coupled to the plurality of suppressor segments, wherein the heat shield comprises a plurality of heat shield segments, wherein each of the plurality of heat shield segments is coupled to one of the plurality of suppressor segments.

In certain aspects, each of the plurality of suppressor segments comprises a bracket portion configured to couple each of the plurality of heat shield segments to one of the plurality of suppressor segments.

BRIEF DESCRIPTION OF THE DRAWINGS

Non-limiting features of some embodiments of the inventions are set forth with particularity in the claims that follow. The following drawings are for illustrative purposes only and show non-limiting embodiments. Features from different figures may be combined in several embodiments. It should be understood that the figures are not necessarily drawn to scale. Distances, angles, etc. are merely illustrative and do not necessarily bear an exact relationship to actual dimensions and layout of the devices illustrated.

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present disclosure provided that the features included in such a combination are not mutually inconsistent.

Figure 1:
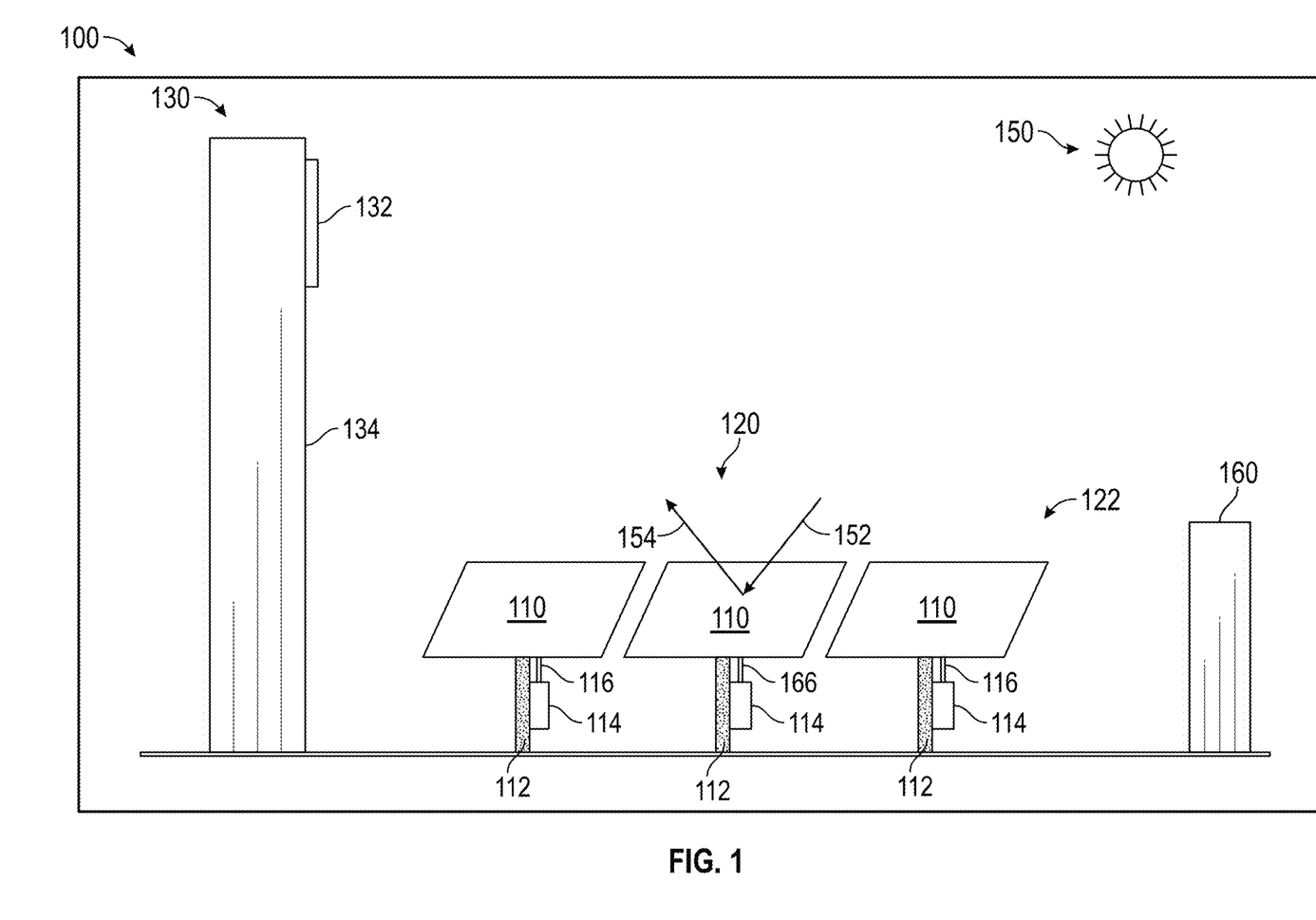
FIG. 1 depicts a schematic view of a concentrated solar power system.

FIGS. 1-8 depict various aspects of a concentrated solar power (CSP) system 100. FIG. 1 depicts a schematic view of an example CSP System 100. The CSP System 100 can include a receiving unit 130, a heliostat array 120, and a power controller 160. The receiving unit 130 can include a receiver system 132 positioned at the top of a tower 134. The heliostat array 120 can include one or more heliostats 122. The heliostats 122 can be supported on shafts or stanchions 112 disposed on or affixed to the ground and/or other heliostats 122. Each heliostat 122 can include a tracking controller 114, an actuator 116, and a mirror 110. The mirrors 110 can receive incoming sunlight 152 from the sun 150 and direct reflected sunlight 154 to the receiver system 132. The tracking controllers 114 can determine the proper orientation of the mirrors 110 throughout the day to maximize the amount of reflected sunlight 154. The power controller 160 can control the heliostat field (e.g., control the orientation of the heliostats) to direct the reflected sunlight 154 to the receiver system 132 throughout the day. The power controller 160 can provide power to each of the tracking controllers 114 and/or actuators 116 that aim the associated mirror 110.

Figure 2:
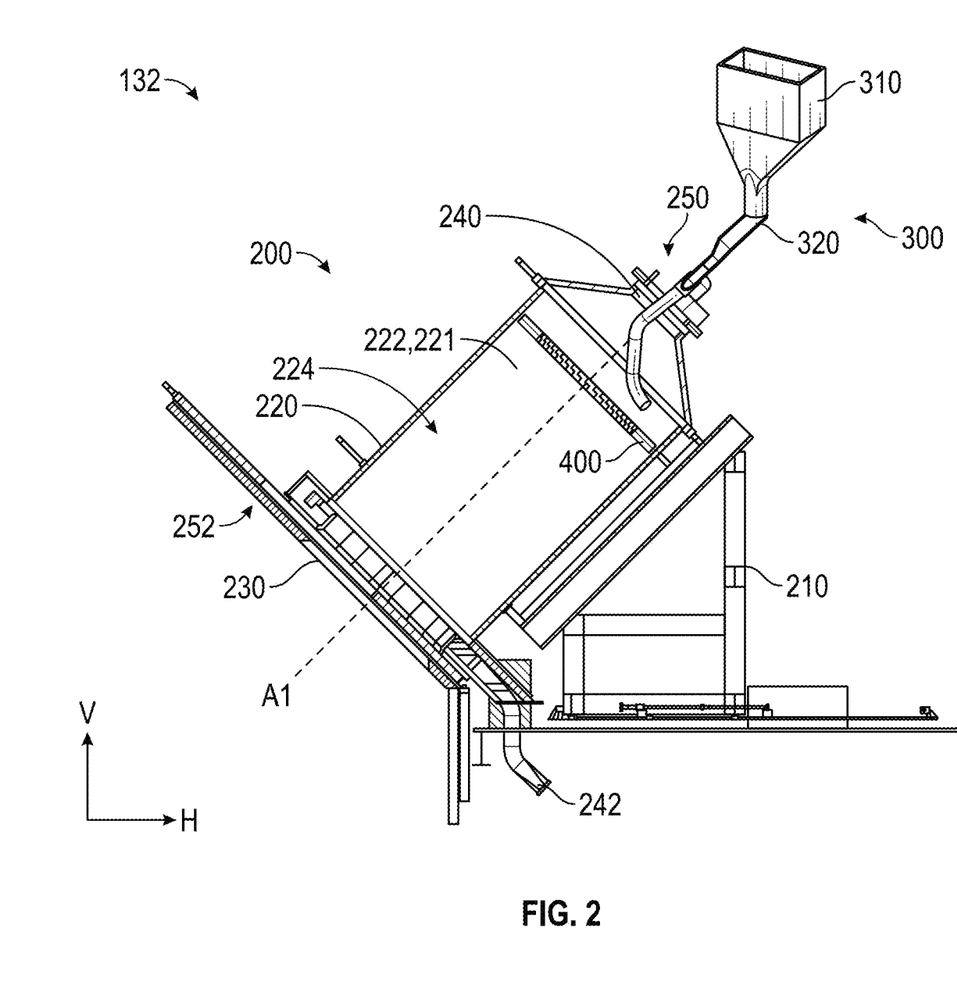
FIG. 2 depicts a schematic view of a receiver system that can be used in the concentrated solar power system of FIG. 1.

FIG. 2 depicts a schematic view of a receiver system 132 that can be used in the CSP System 100 shown in FIG. 1. The receiver system 132 can be located at an elevated position (e.g., on a roof of a building or on top of a tower 134). The receiver system 132 can be exposed to sunlight (e.g., reflected sunlight 154) directed from the mirrors 110 positioned below the receiver system 132. The receiver system 132 can utilize the reflected sunlight 154 to heat particles 270 conveyed through the receiver system 132. In some embodiments, the receiver system 132 can heat the particles 270 to about 1100° C. In some embodiments, the particles 270 can be made of ceramic materials, inorganic materials, or other materials (e.g., sand, coated sand, bauxite, silica, alumina, iron, etc.). In some embodiments, the particles 270 can be substantially ball-shaped. In some embodiments, the particles 270 can have a size (e.g., diameter) between about 10 µm to about 1000 µm, or any range contained therein (e.g., 10-50 µm, 40-50 µm, 200-400 µm, 10-500 µm, etc.). In some embodiments, the particles 270 can be fluidized (e.g., caused to flow like a fluid) with air, where an airflow stream carries particles 270 to the receiver 200 as the particles 270 travel through the receiver system 132. After being heated, the particles 270 can be transferred out of the receiver system 132 to a thermal energy storage. The heated particles 270 can be used for one or more industrial processes (e.g., generate electricity, generate steam, facilitate calcination, facilitate a chemical process, etc.).

Referring to FIG. 2, the receiver system 132 can include a receiver 200 (e.g., centrifugal particle receiver) and a particle feed system 300. The receiver 200 can facilitate the heating of the particles 270 with reflected sunlight 154. In the illustrated implementation, the receiver 200 is a centrifugal receiver. The receiver 200 can include a frame 210, a rotating drum 220, a particle suppressor (e.g., particle suppressor 400, 500, 600, 800), a particle inlet 240, a particle outlet 242, and a solar aperture 230. A plurality of particles 270 can enter the receiver 200 via the particle inlet 240. The particles 270 can be deposited into the rotating drum 220 by the particle feed system 300. The rotating drum 220 can receive solar flux (e.g., reflected sunlight 154) directed through the solar aperture 230 that heats the particles 270 as the rotating drum 220 is rotated (e.g., as the particles 270 are rotated). After being heated, the particles 270 can exit the receiver 200 via the particle outlet 242 (e.g., and be directed to a storage location).

As shown in FIG. 2 the receiver 200 can be supported by a frame 210. The frame 210 can function as a structure upon which other components of the receiver 200 can be attached. The frame 210 can support the rotating drum 220. The rotating drum 220 can house and rotate particles 270 as they are heated by reflected sunlight 154. The rotating drum 220 can be rotatably coupled to the frame 210. The rotating drum 220 can rotate with respect to the frame 210 while the frame 210 remains stationary. In some embodiments, the rotating drum 220 can rotate at any velocity between about 5 m/s and about 10 m/s. In other embodiments, the rotating drum 220 can rotate below 5 m/s or above 10 m/s. In some embodiments, the rotating drum 220 can rotate at any speed between about 65 rpm and about 70 rpm. As shown in FIGS. 1-8, the rotating drum 220 can rotate in the counterclockwise direction. In other embodiments, the rotating drum 220 can rotate in the clockwise direction. The rotating drum 220 can be substantially cylindrical. The rotating drum 220 can include an absorber chamber 224 and an inliner 222. The rotating drum 220 can include a hollow interior defining the absorber chamber 224. The absorber chamber 224 can house the particles 270 as they are heated by reflected sunlight 154. An interior surface 221 of the rotating drum 220 can define an outer boundary of the absorber chamber 224. In some embodiments, an inliner 222 can be disposed on the interior surfaces 221 of the rotating drum 220. The inliner 222 can be coupled to and extend circumferentially around the interior surface 221 of the rotating drum 220. If an inliner 222 is included, the inliner 222 can form the interior surface 221 of the rotating drum 220. In some embodiments, the inliner 222 can be formed from a plurality of tiles. In some embodiments, the inliner 222 can be formed by a coating or liner disposed on the inner surface of the rotating drum 220. In some embodiments, the inliner 222 can be the interior surface 221 of the rotating drum 220 itself (e.g., formed integrally with the rotating drum 220). The inliner 222 can cover all or a significant portion of the interior surface 221 of the rotating drum 220. Particles 270 can be deposited onto the inliner 222 to form a particle film 490 on the inliner 222.

As shown in FIG. 2, the receiver 200 can extend from a first end 250 to an opposing second end 252. The particle inlet 240 can be disposed at or proximate the first end 250 of the receiver 200. The particle inlet 240 can be an opening, port, or the like. The particle inlet 240 can interface with the particle feed system 300 to enable particles 270 to be fed into the receiver 200. The particle outlet 242 can be disposed at or proximate the second end 252 of the receiver 200. The particle outlet 242 can be a collection ring, tube, port, or other structure for receiving and/or collecting particles 270. The particles 270 can exit out of the receiver 200 through the particle outlet 242. The solar aperture 230 can be disposed at the second end 252 of the receiver 200. The solar aperture 230 permits reflected sunlight 154 to enter the receiver 200. Reflected sunlight 154 can be directed through the solar aperture 230 into the absorbing chamber and onto inliner 222. The solar aperture 230 can be a lens, window, opening, or the like. In some embodiments, all or substantially all surfaces of the inliner 222 can be exposed to sunlight.

As shown in FIG. 2, the receiver 200 can be tilted at an inclination angle with respect to the horizontal axis H. In some embodiments, the receiver 200 can be tilted at about 45 degrees from the horizontal axis H. Specifically, the receiver 200 can be tilted such that the particle inlet 240 is disposed above (e.g., vertically spaced from) the solar aperture 230. Particles 270 can be deposited onto the inliner 222 proximal to the first end 250 of the receiver 200. Due to the tilt of the receiver 200, gravitational pull causes the particles 270 to move from the first end 250 to the second end 252 of the receiver 200. The reflected sunlight 154 directed through the solar aperture 230 irradiates the particles 270 as they move from the first end 250 to the second end 252, causing the particles 270 to heat up. Downward motion of the particles 270 can be at least partially counteracted by centrifugal forces caused by rotational motion of the rotating drum 220. Centrifugal forces imparted onto the particles 270 by rotation of the rotating drum 220 can hold the particles 270 against the inliner 222. The rotational speed of the rotating drum 220 can be adjusted to increase or decrease the centrifugal forces imparted onto the particles 270. Accordingly, the rotational speed of the rotating drum 220 can be varied to control the amount of time the particles 270 are exposed to sunlight as they travel from the first end 250 to the second end 252 of the receiver 200. Controlling the exposure time enables control of the particle temperature. After moving from the first end 250 to the second end 252, the particles 270 can exit from or be collected at the particle outlet 242.

The particle feed system 300 can function to accelerate and feed particles 270 into the receiver 200. As shown in FIG. 2, the particle feed system 300 can include a hopper 310 and one or more feedpipes 320. The particle feed system 300 can be disposed at least partially above (e.g., vertically spaced from) the receiver 200 along the vertical axis V such that the force of gravity accelerates particles 270 downwards and into the receiver 200. The hopper 310 can function as a storage chamber for holding particles 270 before they are fed into the receiver 200. The hopper 310 can be a container, chamber, receptacle, or other structure capable of holding a volume of particles 270. The hopper 310 can be controllable to permit or stop the flow of particles 270 out of the hopper 310 and into the one or more feedpipes 320. The hopper 310 can be controllable to vary the flow rate of particles 270 out of the hopper 310.

The one or more feedpipes 320 can transfer particles 270 from the hopper 310 into the receiver 200. The feedpipe 320 can be a tube, chute, pipe, channel, vent, or any other structure capable of conveying particle or fluids. The feedpipe 320 can accelerate particles 270 from rest in the hopper 310 and deposit them onto the inliner 222 of the receiver 200. Particles 270 can be conveyed through the feedpipe 320 by gravitational pull. The feedpipe 320 can be coupled to or extend into the particle inlet 240 of the receiver 200. The feedpipe 320 can include an outlet portion 322 disposed at one end of the feedpipe 320. The outlet portion 322 can be a portion of the feedpipe 320 that controls the flow direction of particles 270 exiting from the feedpipe 320. The outlet portion 322 can be disposed distal to the hopper 310. The outlet portion 322 can have an exit opening 324 through which the particles 270 exit the feedpipe 320. The exit opening 324 can be disposed at a distal end of the feedpipe 320 (e.g., distal to the hopper 310). In other embodiments, the particle feed system 300 may not include a feedpipe 320. Rather, in some embodiments, the particle feed system 300 can include any structure or device capable of feeding particles 270 into the receiver 200.

As mentioned above, particles 270 deposited into the rotating drum 220 can form a stable particle film 490 on the inliner 222. Particles 270 that do not settle into the film may continually bounce around the receiver 200 until being lost out of the solar aperture 230. The particle suppressor 400 (e.g., particle suppressor 400, 500, 600, 800) can reduce the particle loss rate by facilitating the settling of particles 270 into the stable film. Specifically, the particle suppressor 400 can dampen particle bounces and funnel the particles 270 into the stable film. In some embodiments, incorporation of a particle suppressor 400 into the receiver 200 can advantageously reduce particle losses out of the solar aperture 230 by at least 30-50%. By reducing the particle loss rate, the particle suppressor (e.g., particle suppressor 400, 500, 600, 800) can improve overall energy efficiency of the CSP system 100 and reduce operation and maintenance costs for the CSP system 100. Additionally, the particle suppressor (e.g., particle suppressor 400, 500, 600, 800) can facilitate correction of errors in the feed system for the CSP system 100 (e.g., errors in how the feed system delivers particles into the rotating drum 220).

Figure 3:
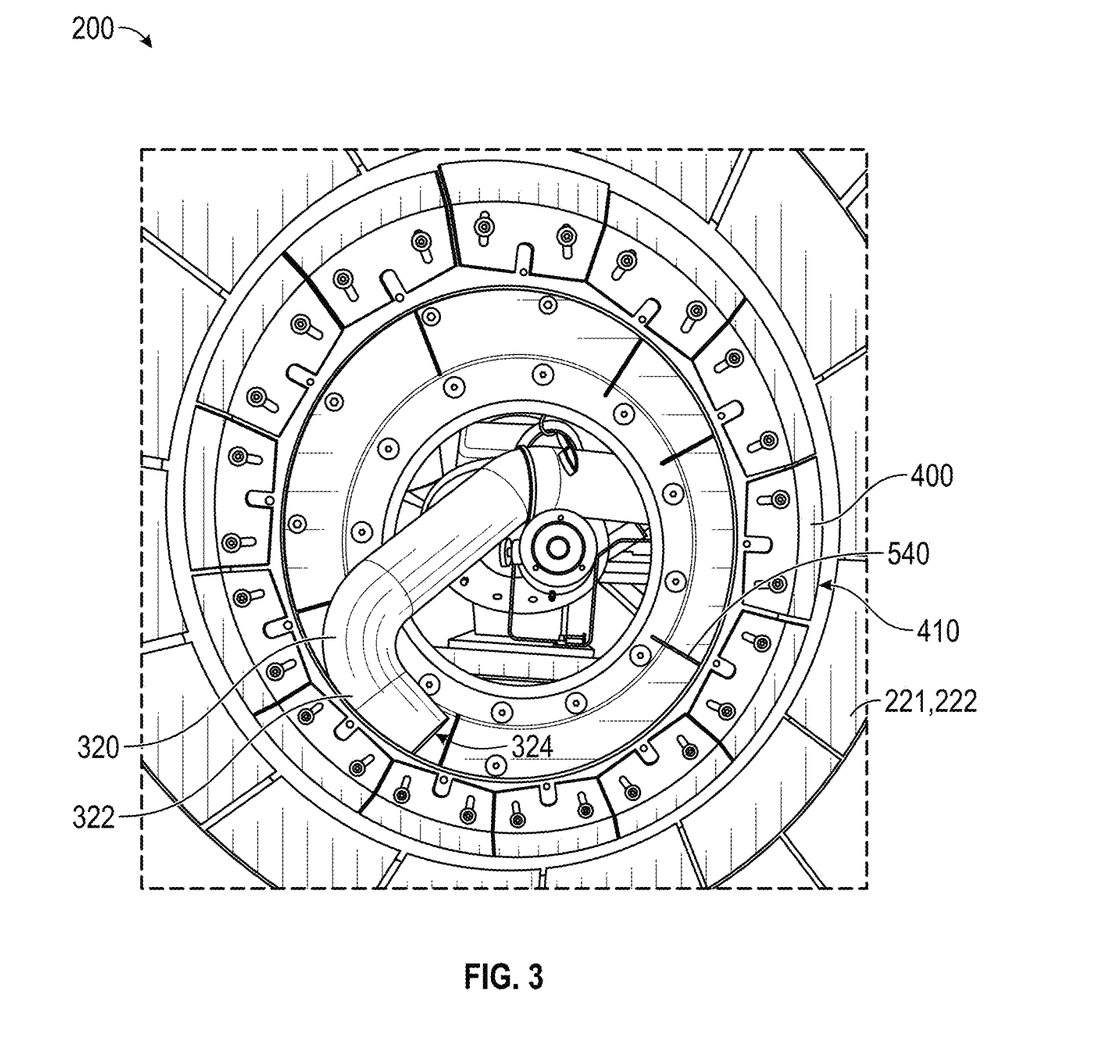
FIG. 3 depicts an interior view of a receiver with a particle suppressor.

FIGS. 3-8 depict various aspects and embodiments of particle suppressors 400, 500, 600, and 800. As shown in FIG. 3, the particle suppressor 400 can be used in a centrifugal particle receiver 200 with a cylindrical rotating drum 220. The particle suppressor 400 can be disposed within the rotating drum 220. Specifically, the particle suppressor 400 can be disposed proximal to the first end 250 of the receiver 200 (see e.g., FIG. 2). The particle suppressor 400 can be disposed between the feedpipe 320 and the second end 252 of the receiver 200. Specifically, the particle suppressor 400 can be positioned adjacent to the outlet portion 322 of the feedpipe 320 such that particles 270 exiting the feedpipe 320 are conveyed directly to the particle suppressor 400. In some embodiments, a heat shield (e.g., heat shield 650, 850) can be coupled to the particle suppressor 400. The heat shield 650, 850 can partially or completely block solar flux from hitting and damaging exposed portions of the inliner 222 or other sensitive components of the receiver 200.

As shown in FIGS. 3-8, the particle suppressor (e.g., particle suppressor 400, 500, 600, 800) can include a retaining surface 410 or wall. The retaining surface 410 can function as a boundary structure for constraining bouncing particles 270 as the particles 270 enter the rotating drum 220. The retaining surface 410 can be suspended above (e.g., disposed radially inward from or spaced away from) the inliner 222 to form a spacing gap SG between the retaining surface 410 and the inliner 222 (see FIG. 4A). In some embodiments, the spacing gap SG can be between about 15 mm to about 20 mm. In other embodiments, the spacing gap SG can be less than 15 mm or greater than 20 mm. By limiting the spacing gap SG between the retaining surface 410 and the inliner 222, any bouncing particles 270 directed into the particle suppressor 400 can be constrained to bounce within a smaller area. The positioning of the retaining surface 410 can cause the particles 270 to have multiple rapid but shortened bounces. Accordingly, the retaining surface 410 can dampen the normal motion of the particles 270 to enable a larger percentage of particles 270 to settle into the stable film more efficiently and quickly.

Figure 4A:
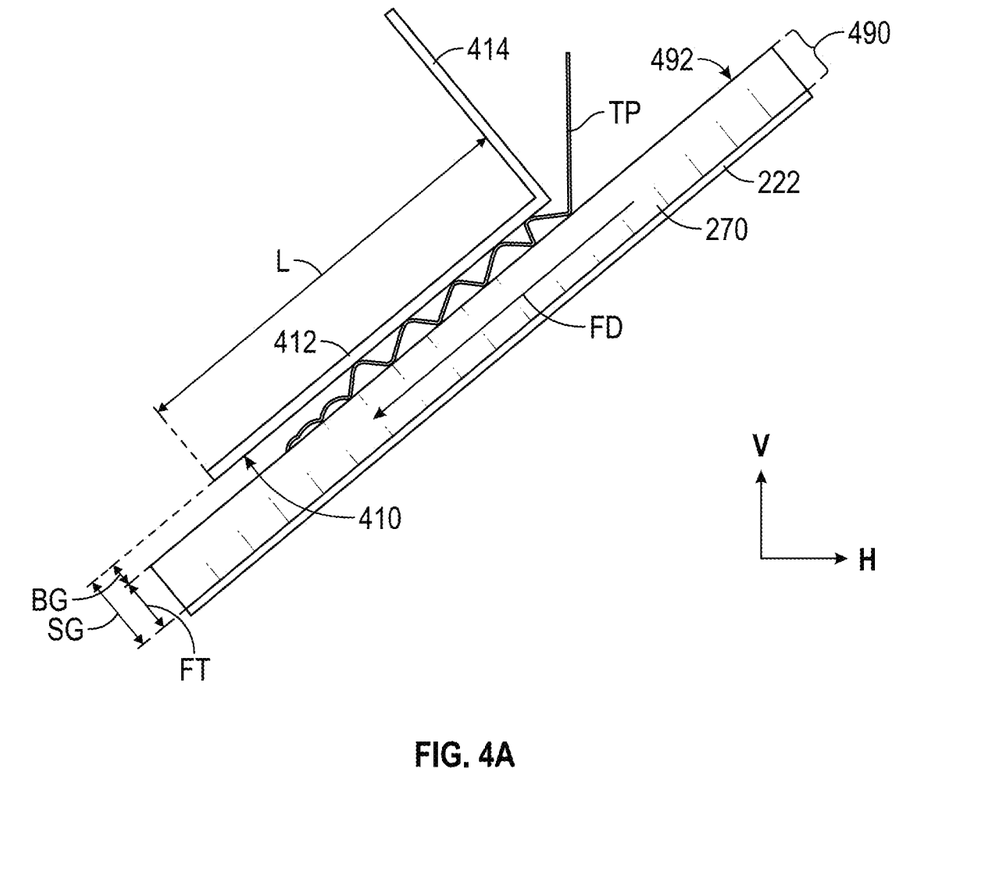
FIG. 4A depicts a partial longitudinal cross-sectional view of a particle suppressor with a first retaining surface profile.

As shown in FIG. 3, to maintain the spaced relationship, the retaining surface 410 can extend concentrically with the inliner 222 around the rotating drum 220 (e.g., around the axis of the rotating drum 220). Accordingly, the retaining surface 410 can have a smaller diameter than the inliner 222 but be centered around the same point or axis. In some embodiments, the spacing gap SG between the retaining surface 410 and the inliner 222 can be substantially constant around the circumference of the inliner 222. Additionally, the retaining surface 410 can extend axially along the longitudinal axis A1 of the rotating drum 220, and the spacing gap SG between the retaining surface 410 and the inliner 222 can be substantially constant along the length of the retaining surface 410. Referring to FIG. 4A, the distance the retaining surface 410 extends along the longitudinal axis A1 can define a length L of the retaining surface 410. In some embodiments, the length L of the retaining surface 410 can be any value between about 150 mm and about 300 mm. In some embodiments, the length L of the retaining surface 410 can be any value between about 200 mm and about 500 mm. In other embodiments, the length L of the retaining surface 410 can be less than 150 mm or greater than 500 mm. In some embodiments, the retaining surface 410 can be oriented substantially parallel to the inliner 222 around the inner circumference of the rotating drum 220.

Figure 4B:
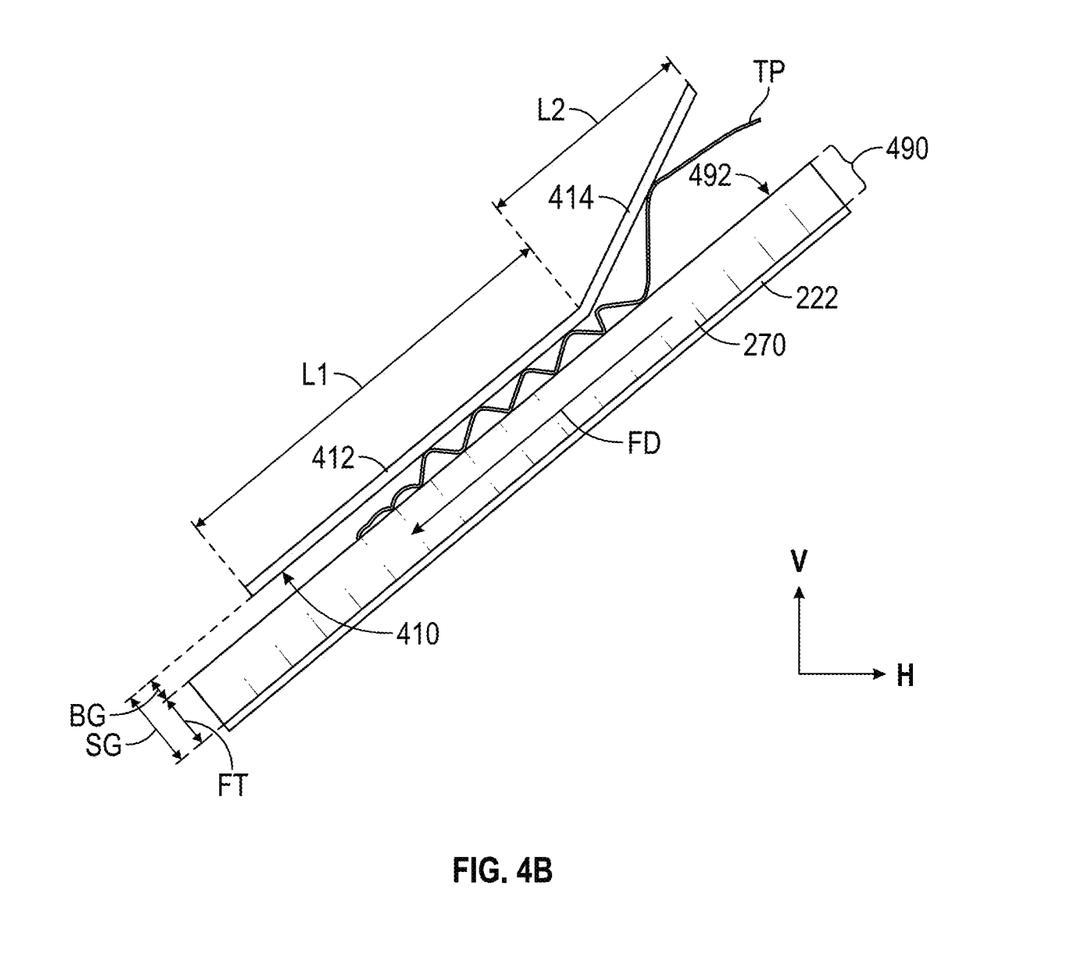
FIG. 4B depicts a partial longitudinal cross-sectional view of a particle suppressor with a second retaining surface profile.

FIGS. 4A-4B depict partial longitudinal cross-sectional views of receivers 200 with particle suppressors 400. The receivers 200 depicted in FIGS. 4A-4B include a fully developed particle film 490 on the inliner 222. However, in the initial moments of operation, a particle film 490 may not be formed on the inliner 222. Without an existing particle film 490, any initial particles 270 fed into the rotating drum 220 can bounce between the retaining surface 410 and the inliner 222 (e.g., interior surface 221 of the rotating drum 220). As more particles 270 are fed into the rotating drum 220, a persistent and stable particle film 490 can develop on the inliner 222 (see FIGS. 4A and 4B). After a particle film 490 has developed, new particles 270 fed into the rotating drum 220 can bounce between the retaining surface 410 and the top surface 492 of the particle film 490 (see FIGS. 4A and 4B). The particle film 490 can have a film thickness FT that extends from the inliner 222 to a top surface 492 of the particle film 490. In some embodiments, the particle film 490 can have a film thickness FT of about 10 mm. In other embodiments, the film thickness FT can be any value suitable for a particular industrial application. The film thickness FT can vary depending on the inclination of the receiver 200, the flow rate of particles 270 into the receiver 200, the type of particles 270, the rotational speed of the rotating drum 220, and various other factors. In some embodiments, the position of the retaining surface 410 can be determined by the height of the particle film 490 to provide a specified bounce gap BG. The bounce gap BG can be defined by the distance between the retaining surface 410 and the top surface 492 of the particle film 490. Particles 270 can bounce within the confines of the bounce gap BG. In some embodiments, the retaining surface 410 can be disposed about 5 mm to about 10 mm away from a top surface 492 of a particle film 490 (e.g., a bounce gap BG of about 5 mm to about 10 mm). In other embodiments, the retaining surface 410 can be disposed less than 5 mm or greater than 10 mm away from the top surface 492 of the particle film 490. Impacts with the particle film 490 can alter the motion and trajectory of particles 270 traveling through the particle suppressor 400.

FIGS. 4A-4B illustrate example particle travel paths TP through a particle suppressor 400. Particles 270 can be fed into the rotating drum 220 by a feedpipe 320. A vertical drop-off distance between the outlet portion 322 of the feedpipe 320 and the inliner 222 can cause the particles 270 to have a normal velocity component (e.g., a velocity component that is perpendicular to the inliner 222/interior surface 221 of the rotating drum 220). This normal velocity component can cause the particles 270 to bounce off of the inliner 222. Due to the inclination of the receiver 200, gravitational pull can cause the particles 270 exiting from the feedpipe 320 to travel through the particle suppressor 400 in illustrated flow direction FD. As shown in FIGS. 4A-4B, after entering the particle suppressor 400 the particles 270 can bounce between the retaining surface 410 and the top surface 492 of the particle film 490. The retaining surface 410 can constrain the bouncing space available to the particles 270, causing the particles 270 to have shortened bounces at an increased frequency. If a stable particle film 490 has already developed on the inliner 222, the particles 270 can impact and bounce between the retaining surface 410 and the particle film 490. If a particle film 490 has not developed yet on the inliner 222, the particles 270 can impact and bounce between the retaining surface 410 and the inliner 222 itself (e.g., the interior surface 221 of the rotating drum 220). The particle impacts into the retaining surface 410 can redirect and impart tangential momentum on the particles 270 to match the velocity of the particle film 490. The particle impacts into the particle film 490 can dampen the normal momentum of particles 270, thereby reducing further bouncing. As the particles 270 travel through the particle suppressor 400, each successive bounce causes the particles 270 to progressively lose normal momentum and eventually settle into the particle film 490. Accordingly, the retaining surface 410 can dampen the normal motion of the particles 270 to enable a larger percentage of particles 270 to settle into the stable film more efficiently and quickly.

FIGS. 4A-4B illustrate two example profiles of the retaining surface 410. According to the retaining surface 410 profile depicted in FIG. 4A, in some embodiments, the retaining surface 410 can be substantially parallel to the inliner 222 along the entire length L of the retaining surface 410. In this arrangement, the spacing gap SG between the retaining surface 410 and the inliner 222 can remain substantially constant along the length L of the retaining surface 410. According to the retaining surface 410 profile depicted in FIG. 4B, in other embodiments, the retaining surface 410 may not be parallel to the inliner 222 along substantially the entire length L of the retaining surface 410. Rather, in some embodiments, the spacing gap SG can vary along the length L of the retaining surface 410.

As shown in FIGS. 4A-4B, in some embodiments, the retaining surface 410 can include a dampening portion 412 and a funneling portion 414. The dampening portion 412 can extend substantially parallel to the inliner 222 such that the spacing gap SG remains constant along the length L1 of the dampening portion 412. In some embodiments, the length L1 of the dampening portion 412 can be any value between about 150 mm and about 300 mm. In other embodiments, the length of the dampening portion 412 can be less than 150 mm or greater than 300 mm. In some embodiments, the spacing gap SG between the inliner 222 and the dampening portion 412 can be about 15 mm. The funneling portion 414 can be coupled to the dampening portion 412. Specifically, the funneling portion 414 can be coupled to an end of the dampening portion 412 that is proximal to the feedpipe 320 and the first end 250 of the rotating drum 220. In some embodiments, the length of the funneling portion 414 can be any value between about 50 mm and about 200 mm. In some embodiments, the length of the funneling portion 414 can be below 50 mm and above 200 mm. In some embodiments, the total length L of the retaining surface 410 can be the sum of the length L1 of the dampening portion 412 and the length L2 of the funneling portion 414. The funneling portion 414 can extend from the dampening portion 412 at an angle. As shown in FIG. 4A, in some embodiments a right angle (e.g., substantially 90-degree angle) can be formed between the dampening portion 412 and the funneling portion 414 such that the funneling portion 414 extends substantially perpendicularly to the inliner 222. As shown in FIG. 4B, in some embodiments, an obtuse angle can be formed between the dampening portion 412 and the funneling portion 414. In other embodiments, any angle between about 180 degree and about 90 degrees can be formed between the dampening portion 412 and the funneling portion 414. The funneling portion 414 can be angled radially inward towards the center of the rotating drum 220. As shown in FIG. 4B, the spacing gap SG between the inliner 222 and the funneling portion 414 can decrease in the particle flow direction FD. Accordingly, a funnel or mouth shape can be formed between the inliner 222 and the funneling portion 414. Compared to a perpendicular funneling portion (see FIG. 4A), a mouthed funneling portion (see FIG. 4B) can provide a more gradual redirection of particles into the dampening portion. As shown by the particle travel depicted in FIGS. 4A-4B, the funneling portion 414 can redirect and funnel bouncing particles 270 into the dampening portion 412. Because the funneling portion 414 has a larger spacing gap SG than the dampening portion 412, the funneling portion 414 can capture bouncing particles 270 that would otherwise bounce over the smaller spacing gap SG of the dampening portion 412. Additionally, the funneling portion 414 can inhibit (e.g., prevent) particles 270 from building up at an inlet region of the particle suppressor 400. Accordingly, inclusion of a funneling portion 414 can improve the effectiveness of the particle suppressor 400 and further reduce the particle loss rate.

Figure 5:
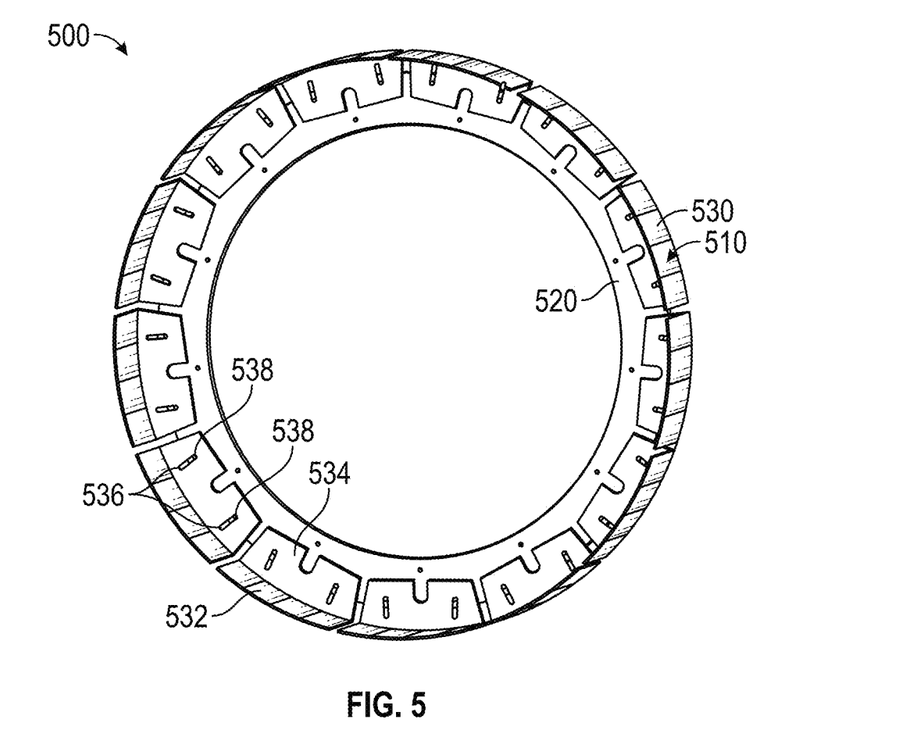
FIG. 5 depicts a perspective view of a particle suppressor according to a first embodiment.
Figure 6A:
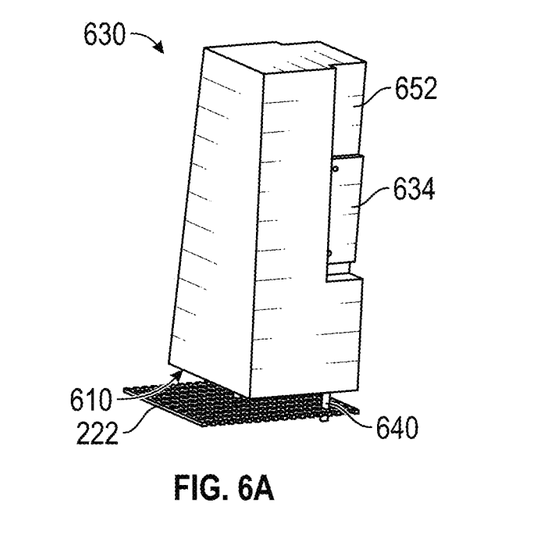
FIG. 6A depicts a perspective view of a suppressor segment according to a second embodiment of the particle suppressor.
Figure 6B:
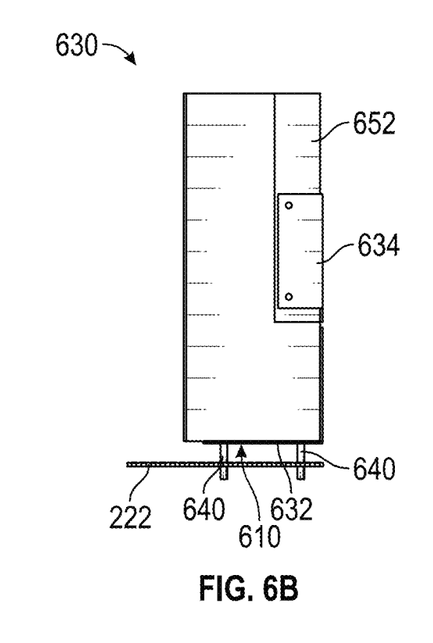
FIG. 6B depicts a side view of the suppressor segment of FIG. 6A.
Figure 6C:
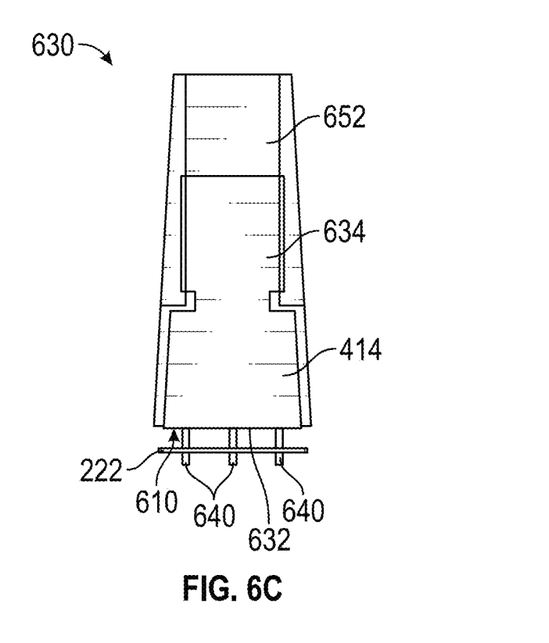
FIG. 6C depicts a rear view of the suppressor segment of FIG. 6A.
Figure 6D:
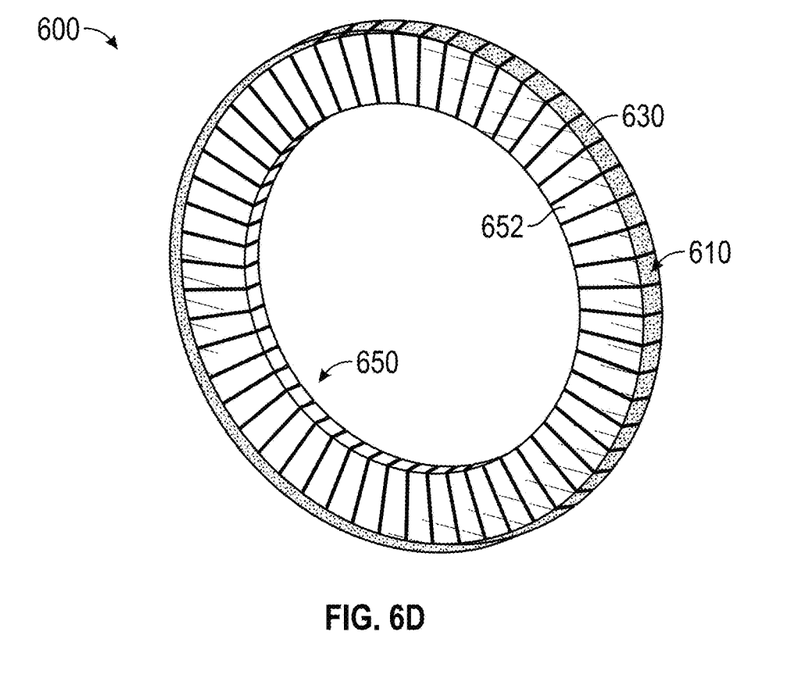
FIG. 6D depicts a perspective view of the particle suppressor according to the second embodiment.
Figure 7:
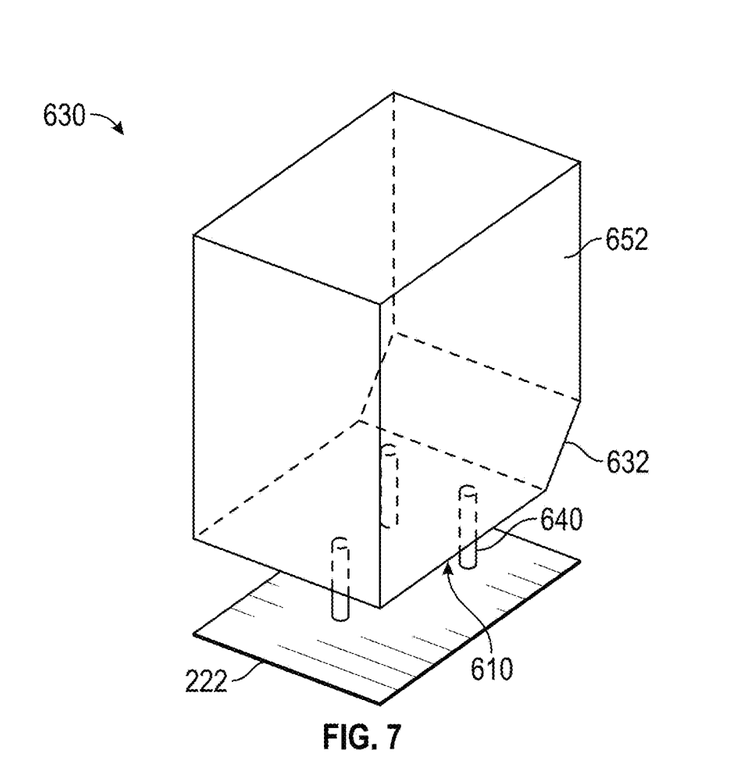
FIG. 7 depicts a perspective view of a suppressor segment with a second retaining surface profile according to the second embodiment of the particle suppressor.

FIGS. 5-7 depict various embodiments and features of the particle suppressor 500. Any one or more of the features, components, or configurations of any one of the embodiments disclosed herein can be combined with any feature, component, or configuration of the other embodiments. FIG. 3 and FIG. 5 depict a first embodiment of the particle suppressor 500. As shown in FIG. 5, the particle suppressor 500 can include a support ring 520 and a plurality of suppressor segments 530. The support ring 520 can function as a structural frame onto which one or more suppressor segments 530 can be attached. The support ring 520 can be a substantially annular structure with a central aperture. In other embodiments, the support ring 520 can be shaped as a circle without a central aperture, or as any other shape. The plurality of suppressor segments 530 can be coupled to the support ring 520. The plurality of suppressor segment 530 can be disposed around the circumference of the support ring 520. Each of the plurality of suppressor segments 530 can form a portion of the retaining surface 510. Collectively, the plurality of suppressor segments 530 can form the retaining surface 510. The retaining surface 510 can have a substantially circular outer dimension. In some embodiments, the plurality of suppressor segments 530 can be positioned close together around the perimeter of the support ring 520 such that the retaining surface 510 is continuous (e.g., without gaps). In other embodiments, as shown in FIG. 5, the plurality of suppressor segments 530 can be positioned around the perimeter of the support ring 520 such that the retaining surface 510 is at least partially discontinuous (e.g., contains one or more gaps). In the illustrated embodiment of FIG. 5, the particle suppressor 500 includes 13 suppressor segments 530. In other embodiments, the particle suppressor 500 can, include one, two, three, or any other number of suppressor segments 530. Inclusion of a higher number of suppressor segments 530 can allow the retaining surface 510 to more closely approximate a perfectly circular outer dimension. The particle suppressor 500 can be suspended within the rotating drum 220 by a support structure 540 (see FIG. 3) coupled to the support ring 520. In some embodiments, the support structure 540 can extend from the support ring 520 to the rotating drum 220. In some embodiments, the support structure 540 can be one or more bolts, rods, frames, arms, brackets, or other structures.

Referring to FIG. 5, in some embodiments, each of the plurality of suppressor segments 530 can include a retaining surface portion 532 and an attachment portion 534. The retaining surface portion 532 can form a portion of the retaining surface 510. The attachment portion 534 can extend from the retaining surface portion 532. In some embodiments, the attachment portion 534 can extend from (e.g., in the same plane as) or be integrous with a funneling portion of the retaining surface 510. The attachment portion 534 can be coupled to the support ring 520. As shown in FIG. 5, each of the plurality of suppressor segments 530 can have a cross-section that is substantially L-shaped to provide a retaining surface profile similar to the profile depicted in FIG. 4A. In other embodiments, each of the plurality of suppressor segments 530 can have a cross-section that is substantially T-shaped or shaped to form any other retaining surface profile (e.g., the retaining surface profile of FIG. 4B).

In some embodiments, the plurality of the suppressor segments 530 can be adjustably coupled to the support ring 520. Specifically, each of the plurality of suppressor segments 530 can be independently moved radially inward or radially outward relative to a center of the support ring 520. Adjusting a suppressor segment 530 can enable the spacing gap SG between the inliner 222 and the retaining surface 510 to be precisely set. In some embodiments, each of the plurality of suppressor segments 530 can include one or more slots 536. The slots 536 can have a length that extends radially outward. The slots 536 can be formed in the attachment portion 534. As shown in FIG. 5, each of the plurality of suppressor segments 530 can include two slots 536 formed in the bracket portion. The support ring 520 can include one or more attachment points 538 that correspond to the one or more slots 536. The attachment points 538 can include screws, rods, bolts, pins, brackets, or other fasteners for securing the suppressor segment 530 to the support ring 520. The suppressor segments 530 can be independently adjusted to move the attachment points 538 within the slots 536. The suppressor segments 530 can be adjusted to alter the spacing gap SG or to orient the angle of the retaining surface 510 with respect to the inliner 222.

FIGS. 6A-7 depict a second embodiment of the particle suppressor 600. As shown in FIGS. 6A-7, the particle suppressor 600 can include a plurality of suppressor segments 630. FIG. 6A and FIG. 7 depict a perspective view of a suppressor segment 630 coupled to a portion of an inliner 222. FIG. 6B depicts a side view of the suppressor segment 630 of FIG. 6A. FIG. 6C depicts a rear view of the suppressor segment 630 of FIG. 6A. FIG. 6D depicts the plurality of suppressor segments 630 coupled together to form the particle suppressor 600. Each of the plurality of suppressor segments 630 can form a portion of the retaining surface 610. Collectively, the plurality of suppressor segments 630 can form the retaining surface 610 (see FIG. 6D). The retaining surface 610 can have a substantially circular outer dimension. As shown in FIG. 6D, the particle suppressor 600 can include a total of 54 suppressor segments 630. In other embodiments, the particle suppressor 600 can include one, two, three, or any other number of suppressor segments 630. Each of the plurality of support segments can be coupled to the inliner 222 and/or interior surface 221 of the rotating drum 220 by one or more standoff rods 640. Each of the standoff rods 640 can extend from the inliner 222 and/or interior surface 221 of the rotating drum 220 to the retaining surface 610. The standoff rods 640 can offset the suppressor segments 630 from the inliner 222 to form a spacing gap SG between the inliner 222 and the retaining surface 610. The standoff rods 640 can be dimensioned to provide the spacing gaps SG described above. As shown in FIGS. 6A-7, the particle suppressor 600 can include three standoff rods 640 coupled to each suppressor segment 630. The standoff rods 640 can be positioned in a triangular arrangement. In other embodiments, the particle suppressor 600 can include one, two, or any number of standoff rods 640. Additionally, in other embodiments, the standoff rods 640 can be positioned in any arrangement. The standoff rods 640 can be any structure capable of spacing and supporting each of the plurality of suppressor segments 630 including but not limited to bolts, beams, rods, pipes, or the like.

As shown in FIGS. 6A-7, a heat shield 650 can be coupled to the particle suppressor 600. The heat shield 650 can be disposed within the outer diameter of the retaining surface 610 (e.g., the heat shield 650 can be disposed radially within the particle suppressor 600). As shown in FIG. 6D, the heat shield 650 can form a substantially annular shape. As shown in FIGS. 6A-7, the heat shield 650 can include a plurality of heat shield segments 652. Each of the plurality of heat shield segments 652 can form a portion of the heat shield 650. Collectively, the plurality of heat shield segments 652 can form the heat shield 650. Each of the plurality of heat shield segments 652 can have a tapered shape such that, when coupled together, the plurality of heat shield segments 652 fit together to form an annular or circular shape. Each of the plurality of heat shield segments 652 can be coupled to one of the plurality of suppressor segments 630.

As shown in FIGS. 6A-6D, in some embodiments, each of the plurality of suppressor segments 630 can include a retaining surface portion 632 and a bracket portion 634. The retaining surface portion 632 can be the portion of the suppressor segment 630 that forms the retaining surface 610. The bracket portion 634 can be coupled to and/or extend from the retaining surface portion 632. Specifically, the bracket portion can extend from a funneling portion 414 of the retaining surface 610. The bracket portion 634 can be dimensioned to couple to a heat shield segment 652. In some embodiments, as shown in FIGS. 6A-6C, the bracket portion 634 can extend over the rear and sides of the heat shield segment 652. The heat shield segment 652 can be secured to the suppressor segment 630 by the bracket portion 634. The heat shield segment 652 can be secured to the suppressor segment 630 by screws, mechanical friction, clamps, bolts, adhesive, or any other fastening mechanism. As shown in FIG. 7, in some embodiments, the suppressor segments 630 may not include a bracket portion 634. Rather, the heat shield segments 652 can be coupled to the retaining surface portions 632.

As shown in FIG. 6A and FIG. 7, different embodiments of the suppressor segment 630 can have different retaining surface 610 profiles. FIG. 6A depicts a perspective view of a suppressor segment 630 with a retaining surface 610 profile similar to the profile depicted in FIG. 4A (e.g., a profile with a constant spacing gap SG). FIG. 7 depicts a perspective view of a suppressor segment 630 with a retaining surface 610 profile similar to the profile depicted in FIG. 4B (e.g., a profile with a varying spacing gap SG). Other embodiments of the suppressor segment 630 can have different retaining surface 610 profiles to those depicted in FIGS. 6A and 7.

Figure 8:
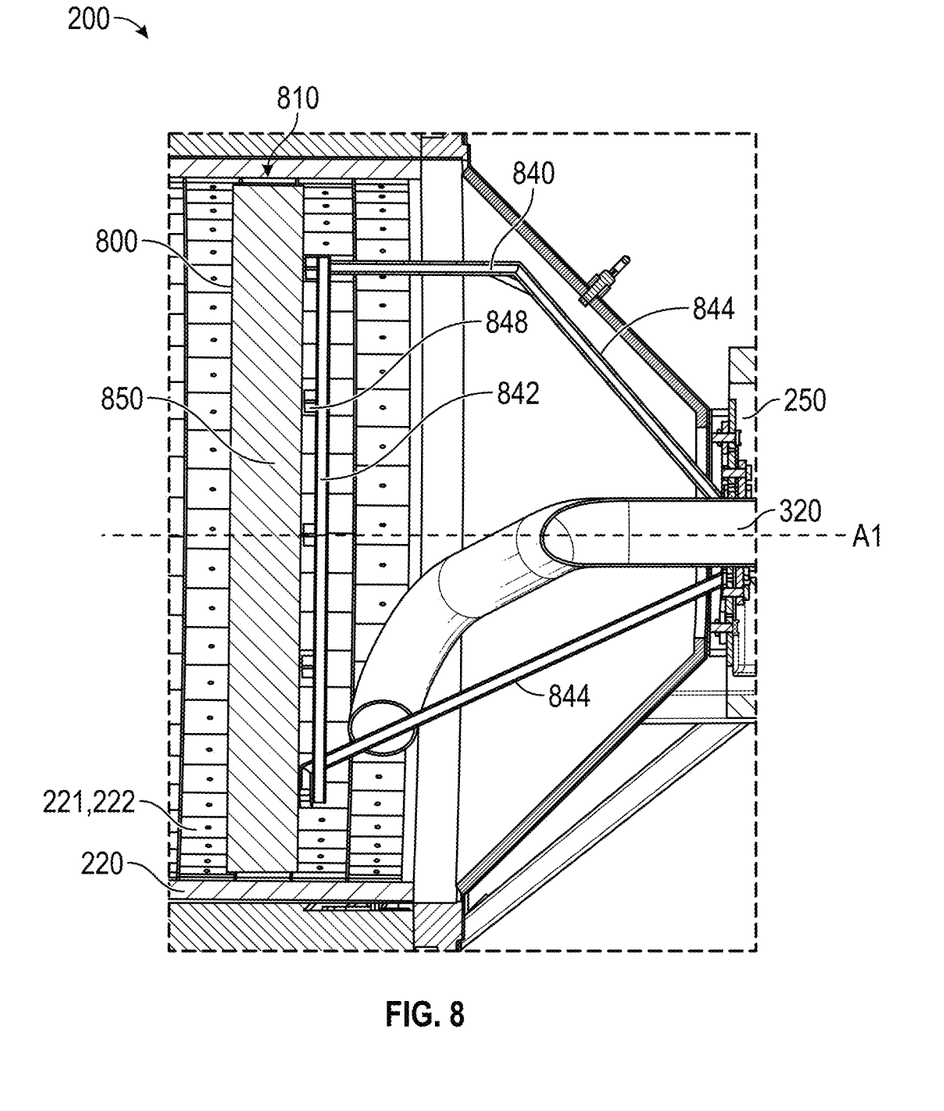
FIG. 8 depicts a longitudinal cross-sectional view a receiver with a particle suppressor according to a third embodiment.

FIG. 8 depicts a longitudinal cross-sectional view of a third embodiment of a particle suppressor 800. As shown in FIG. 8, the particle suppressor 800 can include a retaining surface 810. The retaining surface 810 can be disposed circumferentially within the rotating drum 220 and spaced from the inliner 222 by a spacing gap SG. Optionally, a heat shield 850 can be coupled to the particle suppressor 800. The heat shield 850 can be coupled to the retaining surface 810. The heat shield 850 can be disposed within the outer boundary of the retaining surface 810 (e.g., disposed radially within the retaining surface 810). The heat shield 850 can form a substantially annular shape, a circular shape, or any other shape. In some embodiments, a support bracket 840 can be coupled to the particle suppressor 800. The support bracket 840 can function to suspend the retaining surface 810 within the rotating drum 220. As shown in FIG. 8, the support bracket 840 can be a frame structure that extends from the receiver 200 to the particle suppressor 800. The support bracket 840 can be secured to the retaining surface 810 or other portion of the particle suppressor 800. As shown in FIG. 8, the support bracket 840 can include a ring portion 842 and an arm portion 844. The ring portion 842 can extend concentrically with the retaining surface 810. The ring portion 842 can have a smaller diameter than the retaining surface 810. The ring portion 842 can be coupled to the retaining surface 810 or other portion of the particle suppressor 800 at one or more mounting points 848. The ring portion 842 can be spatially offset from the particle suppressor 800 in the axial direction (e.g., along the longitudinal axis A1). The arm portion 844 can extend from the ring portion 842 and coupled to the first end 250 of the receiver 200. In some embodiments, the support bracket 840 can be fixedly coupled to a fixed portion of the receiver 200 such that the particle receiver 200 and/or heat shield 850 does not rotate with the rotating drum 220. In other embodiments, the support bracket 840 can be coupled to a rotating portion of the receiver 200 or external rotating element such that the particle suppressor 800 and/or heat shield 850 rotates with the rotating drum 220.

While certain embodiments of the inventions have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations, one or more features from a claimed combination can, in some cases, be excised from the combination, and the combination may be claimed as a sub-combination or variation of a sub-combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel"

refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects, and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or sub-combinations of these specific features and aspects of embodiments may be made and still fall within the scope of the invention. Accordingly, it should be understood that various features and aspects of the disclosed embodiments can be combined with or substituted for one another in order to form varying modes of the discussed automobile.

What is claimed is:

1. A receiver comprising:
   a rotating drum having an interior surface;
   an inliner coupled to and extending circumferentially around the interior surface; and
   a particle suppressor disposed within the rotating drum and comprising a retaining surface, wherein the retaining surface is spaced radially inward from the inliner to define a spacing gap between the inliner and the retaining surface, wherein the retaining surface extends concentrically with the inliner, wherein the particle suppressor is configured to dampen a motion of one or more particles introduced into the rotating drum, wherein the particle suppressor is suspended within the rotating drum by a support bracket extending from the particle suppressor to a first end of the receiver.

2. The receiver of claim 1, wherein the retaining surface is substantially parallel to the interior surface.

3. The receiver of claim 1, wherein the spacing gap is about 15 mm to 20 mm.

4. The receiver of claim 1, wherein the retaining surface is disposed about 5 mm to 10 mm away from a top surface of a particle film.

5. The receiver of claim 1, wherein the retaining surface comprises:
   a dampening portion extending substantially parallel to the inliner; and
   a funneling portion coupled to the dampening portion, wherein the funneling portion is angled with respect to the dampening portion, wherein the funneling portion is configured to funnel particles towards the dampening portion.

6. The receiver of claim 1, wherein the particle suppressor is configured to rotate with the rotating drum.

7. The receiver of claim 1, wherein the support bracket is fixedly coupled to the receiver such that the particle suppressor does not rotate with the rotating drum.

8. The receiver of claim 1, further comprising a heat shield coupled to the particle suppressor, wherein the heat shield is disposed radially within the particle suppressor.

9. The receiver of claim 1, wherein the particle suppressor is configured to reduce a particle loss rate of the receiver by at least 30%.

10. A particle suppressor for a receiver having a rotating drum, the particle suppressor comprising:
    a support ring; and
    a plurality of suppressor segments coupled to and extending circumferentially around the support ring, the plurality of suppressor segments each comprising a portion of a retaining surface, wherein the retaining surface is configured to be spaced radially inward from and extend concentrically with an interior surface of the rotating drum, wherein a spacing gap is formed between the interior surface and the retaining surface, wherein the retaining surface is configured to dampen a motion of one or more particles introduced into the rotating drum.

11. The particle suppressor of claim 10, wherein the plurality of suppressor segments are adjustably coupled to the support ring, wherein each of the plurality of suppressor segments can be independently moved radially inward or radially outward relative to a center of the support ring.

12. The particle suppressor of claim 11, wherein each of the plurality of suppressor segments is adjustably coupled to the support ring by a plurality of attachment points.

13. The particle suppressor of claim 12, wherein each of the plurality of suppressor segments comprises a plurality of slots, wherein each of the plurality of suppressor segments can be adjusted by moving the plurality of attachment points within the plurality of slots.

14. The particle suppressor of claim 10, wherein each of the plurality of suppressor segments are L-shaped.

15. The particle suppressor of claim 10, wherein the particle suppressor is suspended within the rotating drum by a support structure extending between the rotating drum and the support ring.

16. A particle suppressor for a receiver having a rotating drum, the particle suppressor comprising:
    a retaining surface extending concentrically with an interior surface of the rotating drum, wherein the retaining surface is disposed radially inward from the interior surface to define a spacing gap between the interior surface and the retaining surface; and
    a plurality of suppressor segments, wherein each of the plurality of suppressor segments comprises a portion of the retaining surface, wherein the retaining surface is configured to dampen a motion of one or more particles introduced into the rotating drum, wherein each of the plurality of suppressor segments is coupled to the rotating drum by a standoff rod.

17. The particle suppressor of claim 16, further comprising a heat shield coupled to the plurality of suppressor segments, wherein the heat shield comprises a plurality of heat shield segments, wherein each of the plurality of heat shield segments is coupled to one of the plurality of suppressor segments.

18. The particle suppressor of claim 17, wherein each of the plurality of suppressor segments comprises a bracket portion configured to couple each of the plurality of heat shield segments to one of the plurality of suppressor segments.

\* \* \* \* \*